No. 692,936. Patented Feb. 11, 1902.
J. T. SMITH.
MACHINE FOR TREATING FLAX.
(Application filed Apr. 17, 1900. Renewed Mar. 8, 1901.)
(No Model.) 3 Sheets—Sheet 1.
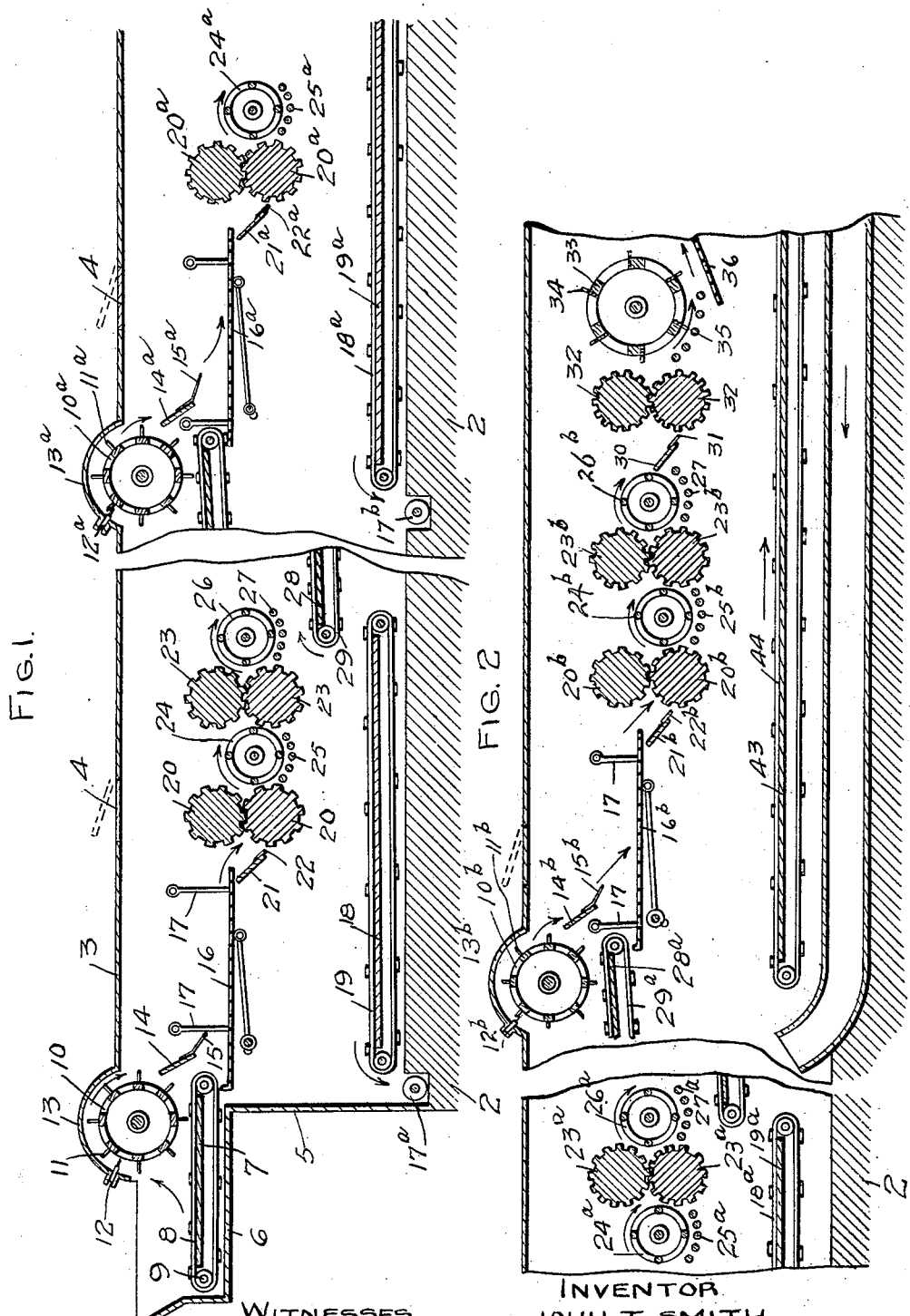
WITNESSES
INVENTOR
JOHN T SMITH
BY Paul & Hawley
HIS ATTORNEYS

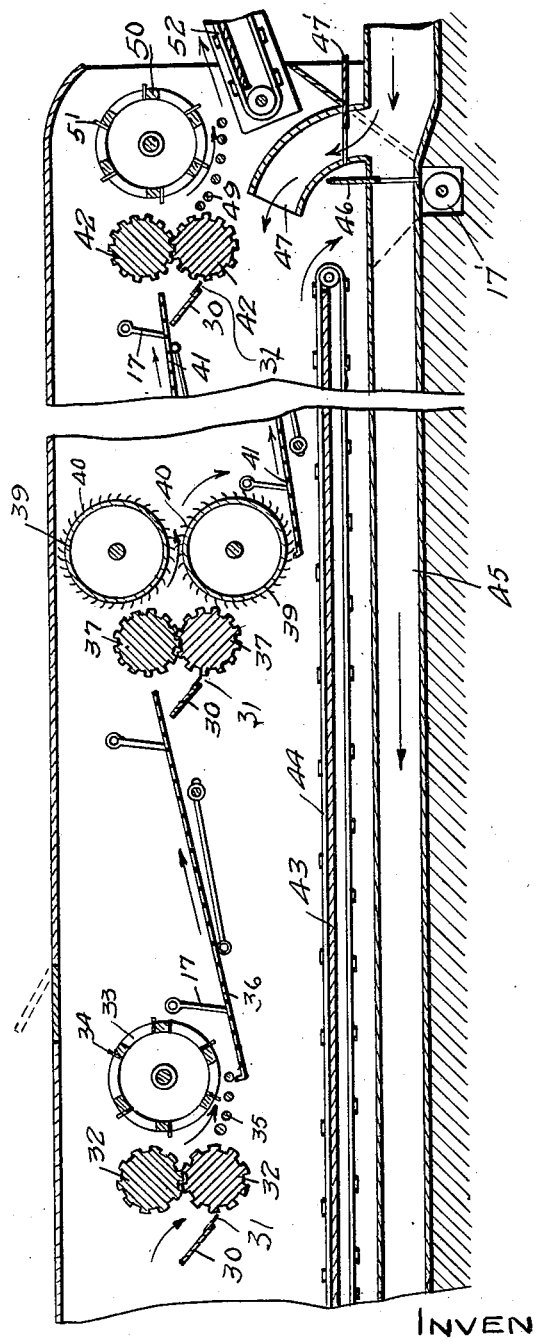

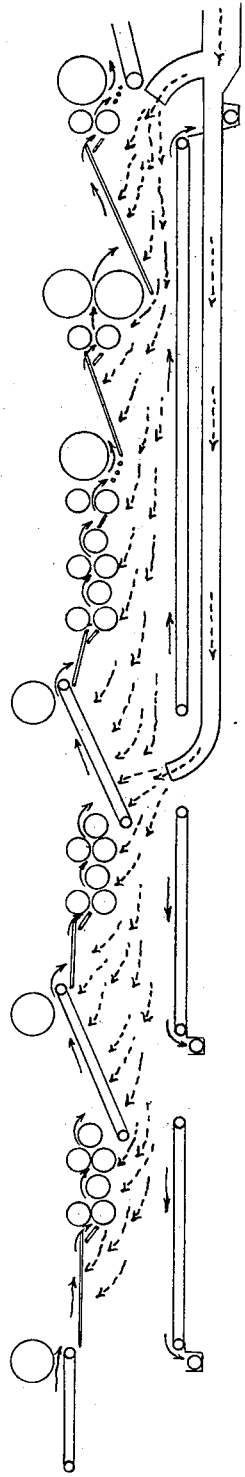

UNITED STATES PATENT OFFICE.

JOHN T. SMITH, OF HERON LAKE, MINNESOTA.

MACHINE FOR TREATING FLAX.

SPECIFICATION forming part of Letters Patent No. 692,936, dated February 11, 1902.

Application filed April 17, 1900. Renewed March 8, 1901. Serial No. 50,408. (No model.)

*To all whom it may concern:*

Be it known that I, JOHN T. SMITH, of Heron Lake, Jackson county, Minnesota, have invented certain new and useful Improvements in Machines for Treating Flax and Hemp Straw or Tow, of which the following is a specification.

The invention relates to machines for treating straw and tow; and the object of the invention is to provide a machine for drying and cleaning flax and hemp straw or tow that can be successfully operated under adverse atmospheric conditions, as in wet stormy weather, when the straw and tow cannot be dried by exposure in the open air.

A further object is to provide a machine wherein the straw may be treated without the necessity of first putting it through the retting process, although stock that has been retted may be successfully treated in the machine, if desired.

A further object is to provide a machine or apparatus wherein straw and tow stock that is damp or even thoroughly saturated with moisture may be dried quicker and more thoroughly than by the method frequently employed of spreading it upon the ground or a floor and drying it by exposure to the sun and air.

A further object is to provide a machine adapted to receive the flax or hemp straw from a stack or a coarse grade of tow from the crushing-rolls of a break-machine and deliver the finished product in a condition suitable for paper-stock or for spinning purposes.

The invention consists generally in various constructions and combinations, all as hereinafter described, and particularly pointed out in the claims.

In the accompanying drawings, forming part of this specification, Figure 1 is a longitudinal vertical section of the receiving end of a flax and hemp treating machine embodying my invention, the middle portion being broken away. Fig. 2 is a similar view of the middle portion of the machine. Fig. 3 is a longitudinal vertical section of the delivery end of the machine, a portion of the same being broken away. Fig. 4 is a diagrammatic view of the mechanisms assembled and in their proper relative positions.

In the drawings, 2 represents a suitable base whereon the apparatus is arranged. The working parts of the machine are inclosed within an elongated box or casing having closed sides and a top 3, that is imperforate, except for the trap-doors 4, provided at intervals therein to permit the circulation of air through the interior of the casing. The mechanism which I prefer to provide within said casing consists of a series of successively-arranged crushing, beating, and picking devices alternating with slowly-moving shakers whereon the material is held for a considerable period and acted upon by the currents of warm air.

The following is a detailed description of the successive mechanisms through which the material is passed: At the receiving or forward end of the machine is an end board or plate 5, above which I prefer to arrange a hopper 6 to receive the flax or hemp straw from a carrier or from any other suitable straw-delivering mechanism that may be provided. Within the hopper 6 I prefer to provide a horizontal plate or board 7, over which an open-slatted conveyer 8, that is mounted upon the shafts 9, is adapted to slide. This conveyer, with the other mechanism of the machine, is driven from a suitable gearing (not shown) provided on the outer wall of the casing, which in turn is operated from a suitable source of power. The material that is deposited in the hopper falls upon the slatted conveyer and is carried back thereby to a revolving picker, while the refuse and other fine material falling upon the floor 7 is swept by the conveyer toward the discharge end of the hopper. Above the conveyer 8 I arrange a drum or cylinder 10, mounted on a suitable shaft and having a series of slats arranged longitudinally at intervals, each slat being provided with a series of projecting pins 11, adapted to pick up the straw and carry it up over said cylinder past a series of pins 12, provided in the arched portion 13 of the top of the casing, said pins forming a comb device to pull the material apart, loosen the matted or tangled portions, and comb out the long fibers. From the teeth or pins of the picker or comb cylinder the straw falls upon an inclined plate 14, arranged transversely within said casing and provided on its lower edge with a flexible plate 15, that is preferably of tin or similar material that can be easily bent and adjusted at any desired angle with respect to the plate to which it is secured. The fine refuse material that is shaken out of the stock by the picker falls down behind the inclined plate, while the straw passes over the plate and falls upon a perforated shaker 16, suspended upon links 17 and reciprocated from a crank-shaft and pitman or in any other suitable way. Beneath the shaker 16 at the bottom of the casing I provide a transverse screw conveyer 17$^a$, and near said conveyer is a horizontal floor or plate 18, over which a slatted conveyer 19 is adapted to operate and gather up the fine refuse material that falls down behind the plate 14 and through the perforations in said shaker and deliver the same to said transverse conveyer to be taken out of the machine. The outer end of the shaker 16 is beneath the inner end of the conveyer 8, so that considerable of the refuse material that falls upon the floor 7 is carried to the conveyer 17$^a$ direct without first passing with the material up over the revolving picker. The straw falling upon the shaker 16 is thoroughly agitated thereby and advanced in a thin stream toward the crushing-rolls 20, arranged one above the other and provided with fluted or corrugated surfaces to thoroughly crush and flatten the material passing between them. An inclined plate 21 is arranged beneath the inner end of the shaker 16, and said plate has secured to its lower edge a flexible strip 22, that may be adjusted close to the corrugations of the lower roll. The inclined plate will direct the stream of straw into the rolls, and any fine refuse material that falls upon said plate will slide down between the same and the crushing-rolls upon the conveyer 19 beneath. Near the crushing-rolls 20 I prefer to provide a second set 23, corresponding to the first set described, and between the pairs of rolls I arrange a beater 24, adapted to receive the stream of straw from the first set of rolls and deliver it to the second set, shaking and beating the same in the meantime to remove the refuse material that has been dislodged by the first set of rolls. Beneath the beater 24 I provide a grating 25, composed of a series of rods arranged at intervals, which prevents any of the straw that may be carried down under the beater from falling upon the conveyer-belt beneath. In the rear of the crushing-rolls 23 is a second beater 26, arranged, preferably, above the horizontal plane of the first beater and adapted to beat and pound the stream of material, now changed to a coarse grade of tow, against the corrugations of the upper roll 23. Beneath the beater 26 I prefer to provide a grating 27. Beneath and in the rear of the beater 26 is an inclined floor 28, over which a slatted conveyer 29 is adapted to operate and carry the material from said beater up to a second revolving picker 10$^a$, corresponding substantially in its functions to the one heretofore described. The conveyer 29 is adapted to run slowly, and I prefer to drive the beater 26 at about five times the speed of said conveyer, and as the material passes over the beater 26 in a stream about three inches in thickness it follows that the tow stock will pile up on the conveyer 29 to a depth of about fifteen inches. This conveyer is preferably about fifty feet long, and as it travels slowly the material thereon may be dried considerably by being subjected to the influence of a blast of hot air, as hereinafter described. Upon reaching the revolving picker 10$^a$ the material is treated in the manner heretofore described and thrown upon the second perforated shaker 16$^a$, and from thence passes to two sets of crushing-rolls 20$^a$ and 23$^a$, arranged in pairs, and over two revolving beaters 24$^a$ and 26$^a$, that are with the crushing-rolls, the same as those heretofore described, except that they are driven at a higher speed and the rolls have finer corrugations, the material being subjected to the same treatment as when it passed through the first series of crushing-rolls. A transverse conveyer 17$^b$ is preferably arranged beneath the second shaker to carry the refuse material out of the machine, and a long slatted conveyer 18$^a$, corresponding to the one heretofore described, is provided beneath the second series of crushing-rolls and adapted to operate over a close floor 19$^a$ and deliver the material thereon to said transverse conveyer 29$^a$. A long slowly-moving conveyer is provided in the rear of the second set of rolls and beaters and is adapted to carry the material up to a third revolving picker 10$^b$, corresponding to those heretofore described. The second slowly-moving conveyer 29$^a$ is substantially the same length as the first, is arranged to operate over a closed floor, and has the same or, if preferred, a little greater speed with reference to the last beater of the series than the slowly-moving conveyer first described. The second set or series of crushing-rolls and beaters occupies a space near the middle of the machine-casing, and I prefer to provide a third set of rolls 20$^b$ and 23$^b$ and beaters 24$^b$ and 26$^b$ and a third shaker 16$^b$ to receive the tow-stock from the third revolving picker and subject it to a crushing and beating treatment that will still further reduce the stock and remove any refuse material that may be still clinging thereto. These rolls 20$^b$ and 23$^b$ have still finer corrugations and with the beaters are driven at a still higher speed than those heretofore described. Near the last beater of the third series I prefer to provide an inclined plate 30, having at its lower edge a flexible strip 31 and adapted to deliver the material to the fluted or corrugated rolls 32, from which it passes to a cylinder or drum 33, provided on its peripheral surface with a series of pins 34, arranged at intervals thereon and adapted to pick up the tow and carry it under the revolving cylinder, over a grating 35, and deliver the same to an inclined perforated shaker-plate 36, that thoroughly agitates the stock, removing any seeds, woody portions, or other refuse matter that may not have been shaken out by the preceding treatment. From the shaker-plate 36 the material passes to the crushing-rolls 37, being directed thereto by an inclined plate corresponding to the plate 30. Near the crushing-rolls 37 I provide a pair of large carding-cylinders 39, having on their surfaces a series of curved hooks 40, that are adapted to card the stream of tow stock as it passes between the cylinders, which are arranged a sufficient distance apart to receive the stream of tow as it is discharged from between the crushing-rolls 37. The material as it passes from the carding-cylinders falls upon the perforated shaker 41, that is arranged at an incline and has a reciprocating movement to advance the material up to the final set of crushing-rolls 42, provided near the delivery end of the machine. The shaker 41 may be made any desired length, and as the tow stock travels over it slowly the tow may be subjected to a blast of hot air and thoroughly dried before entering the final set of crushing-rolls. I prefer to provide an inclined plate beneath the upper end of the shaker 41 to direct the material therefrom between the rolls. Near the delivery end of the casing I provide a third transverse conveyer 17°, corresponding to those heretofore described, and extending beneath the third series of rolls and beaters is a horizontal floor 43, over which a long slatted conveyer 44 is adapted to operate in a direction opposite to the movement of the corresponding conveyers at the receiving end of the machine and to gather up the refuse material that is separated from the tow stock by its passage through the mechanism heretofore described and deposit it in said third transverse conveyer to be carried out of the machine. In the bottom of the casing I provide a horizontal air-trunk 45, having its open inner end upwardly turned to discharge the blast of air into the interior of the casing at a point preferably beneath the second inclined conveyer 29ª. The outer end of the air-trunk 45 is connected with a suitable blast-fan, by means of which air heated to any degree of temperature may be forced into the casing. I prefer to provide a slide gate or valve 46, by means of which the current of air may be regulated. In order that the air-current may be directed into the casing near the delivery end of the machine, I provide a branch 47, leading from said air-trunk into the space beneath the final crushing-rolls, to permit the operator to pass the current of hot air through the material as it is slowly moved up the inclined shaker-plates 36 and 41, provided near the delivery end of the machine. I prefer also to provide a regulating slide or gate 47' in the branch 47. By means of this hot-air-blast apparatus a mass of flax or hemp straw may be taken directly from the retting-tank and thoroughly dried and cleaned with one passage through the machine, and in wet weather when the straw or tow stock lying in the field has absorbed considerable moisture the machine can be operated and the stock treated as effectually as it could be if thoroughly dried when fed into the machine. From the final set of crushing-rolls the stock passes between a grating 49 and a revolving beater 50, having on its periphery a series of plates 51, which tend to spread out the stream of tow, separating any refuse material therefrom and permitting it to fall down through the grating into the transverse conveyer beneath and finally delivering the finished product to the carrier 52, by which it is conveyed to a suitable baling-press ready for use as paper-stock or for spinning purposes.

The straw is fed into the first set of rolls to their full capacity and after passing through the same and over the beaters falls upon the first slowly-moving conveyer, which is placed a sufficient distance below the rolls and beaters to permit the material to pile up thereon to the desired height and be carried up to the revolving picker. From the picker the crushed and beaten material passes on to the second series of rolls and beaters and is there subjected to a second crushing and beating as rapidly as though it came in a stream from the first set of rolls and falls upon the second slow-moving conveyer. By providing the long slow-moving conveyers in connection with the sets of more rapidly-operated rolls and beaters I am able to thoroughly dry the stock while it is being subjected to the crushing and beating process and at the same time operate the machine at its full capacity.

From the foregoing description it will be noted that the straw is converted to a coarse grade of tow after passing through the second set of crushing-rolls. The material is delivered to the long slowly-moving conveyers 28 and is carried up to the pickers at the upper ends of the conveyers in streams several times as thick as those that pass between the first and second sets of rolls, and as the mass of material is slowly carried along by the conveyers over the floors, which may be perforated, if preferred, it is subjected to blasts of hot air and a large percentage of the moisture removed therefrom. After passing through the second set of rolls the reduced material enters the third set and from thence passes on to the shakers, which I have shown perforated; but the same may be made with closed bottoms, if preferred, and after leaving the shakers the material is carded and beaten and finally delivered to the carrier at the discharge end of the machine. The straw is thus thoroughly crushed and beaten, the woody refuse material separated therefrom, and the fiber reduced to a fine grade of tow. The apparatus is also adapted for subjecting the tow as it is discharged from the break-machine to a further reduction and cleaning treatment, in which case the carrier at the discharge end of the break-machine would be arranged to deliver the tow upon the endless conveyer provided in the hopper shown herein. The apparatus is also adapted for drying and treating flax or hemp tow that is saturated with moisture, and I am therefore able to carry on the reduction and cleaning of tow stock in stormy weather when tow, being extremely susceptible to a damp atmosphere, cannot be ordinarily treated or handled.

I am aware that the relative arrangement of the conveyers and rollers may be modified and the length and speed of the conveyers and shakers changed, and I therefore do not wish to be confined to the particular construction herein set forth.

Having thus described my invention, I claim as new and desire to secure by Letters Patent—

1. The combination, with a box or casing having closed sides and a top closed except for air-holes provided at intervals therein, the ends of said box being provided with receiving and discharge openings, of a crushing and cleaning mechanism provided within said box adapted to treat the straw or tow stock fed into the same to soften the fiber and separate the refuse material therefrom, and a hot-air-blast apparatus provided within said box and adapted to direct blasts of air through the material as it passes over or through said mechanism, substantially as described.

2. A machine for treating flax or hemp straw, comprising a long box or casing having closed sides and a top closed except for ventilating-openings provided therein, the ends of said box having receiving and discharge openings respectively, a crushing and cleaning mechanism provided within said box and through which the straw stock is fed to separate the refuse material and soften the fiber, transverse conveyers provided in the bottom of said box beneath said mechanism to carry the refuse material out of the machine, floors or plates provided beneath said mechanism to receive the refuse material therefrom, slatted conveyers operating over said floors to gather up the material thereon and deposit it in said transverse conveyers, and an air-blast apparatus provided within said casing and adapted to direct currents of air through the material passing over said mechanism, substantially as described.

3. A machine for treating flax or hemp straw, comprising a long box or casing having closed sides and a top, and ends provided respectively with receiving and discharge openings, the crushing and cleaning mechanism provided within said casing and adapted to receive the flax or hemp straw, crush and soften the same and separate the refuse material therefrom, means provided in the bottom of said casing to receive the refuse material and convey it out of the machine, and means for establishing an air-blast through the material as it passes over or through said crushing and cleaning mechanism, substantially as described.

4. The combination, with a long box or casing, having a top and closed sides and provided in its ends with receiving and discharge openings, of a crushing and cleaning mechanism provided within said casing to which the straw is fed through said receiving-opening, means provided beneath said crushing and cleaning mechanism to gather up the refuse material therefrom and convey it out of the machine, an air-trunk provided in the bottom of said casing and having a discharge-opening near the middle section of said crushing and cleaning mechanism, a second discharge-opening provided in said trunk near the delivery end of said casing, whereby the material passing through said mechanism may be subjected to a blast of air, substantially as described.

5. The combination, with a box or casing having a hopper at one end, of a floor provided in said hopper, a conveyer operating over said floor, a picker provided in said casing above said conveyer, a perforated shaker whereon the material falls from said picker, an inclined guiding-plate provided above said shaker, and a flexible strip provided on the lower edge of said inclined plate, substantially as described.

6. In a machine of the class described, the combination, with the box or casing having a hopper at one end, of a conveyer operating over the bottom of said hopper, a picker provided above said conveyer and adapted to catch up and separate the material thereon, the perforated shaker whereon the material is thrown by said picker, crushing-rolls provided in the rear of said shaker and adapted to receive the material therefrom, an inclined plate provided beneath said shaker near said crushing-rolls, and an adjustable strip or plate provided on said inclined plate, substantially as described.

7. In a machine of the class described, the combination, with a long closed box having a hopper at one end and a discharge-opening at the other, of a conveyer provided in said hopper whereon the material is deposited, a picker provided above said conveyer, a shaker adapted to receive the material from said picker, crushing-rolls provided in the rear of said shaker, a beater to receive the material as it passes over said crushing-rolls, a long slowly-moving conveyer whereon the material is deposited from said beater, and means for maintaining a current of air through the material as it passes between said rolls and is carried along by said conveyer, substantially as described.

8. The combination, with the long closed box or casing, having a hopper-opening at one end and a discharge-opening at the other, of a shaker provided near said hopper-opening, crushing-rolls adapted to receive the material from said shaker, beaters provided near said crushing-rolls, a slow-moving upwardly-inclined conveyer to receive the tow material from said beaters, a picker provided above the upper end of said conveyer, a second shaker to receive the material from said picker, a second series of crushing-rolls and beaters to receive the material from said second shaker, and means for establishing a current of warm air through and under the material as it passes over said shakers and beaters and through said rolls, substantially as described.

9. The combination, with the closed box or casing, having a hopper-opening at one end and a discharge-opening at the other, of a conveyer provided near said hopper-opening to receive the tow material and convey it back into the machine, a shaker to receive the tow material from said conveyer, a series of crushing-rolls and beaters in the rear of said shaker, a slowly-moving conveyer adapted to receive the tow material from the last-named beater of the series, a picker provided above said slow-moving conveyer, a second shaker, a second series of crushing-rolls and beaters, a second slow-moving conveyer, and means for maintaining a current of warm air through and under the material on said slow-moving conveyers, whereby the streams of tow material are thoroughly dried before reaching the discharge end of said casing, substantially as described.

10. The combination, with the closed box or casing, having a hopper-opening at one end and a discharge-opening at the other, of a conveyer provided near said hopper-opening and whereon the material to be treated is deposited, a series of cleaning and crushing mechanisms to receive the tow material from said conveyer, a slow-moving conveyer adapted to receive the material from said cleaning and crushing mechanism, a second series of cleaning and crushing mechanisms, a second slow-moving conveyer, a third series of cleaning and crushing mechanisms, means provided beneath said cleaning and crushing mechanisms to receive the refuse material therefrom and carry it out of said casing, an air-trunk provided in the bottom of said casing and adapted to direct currents of air through and under the material as it passes through said cleaning and crushing mechanisms and is carried along by said conveyers, whereby the tow material is thoroughly dried before reaching the delivery end of said casing, substantially as described.

11. The combination, with the closed box or casing, having a hopper at one end and a discharge-opening at the other, of a conveyer provided in said hopper, a series of cleaning and crushing mechanisms adapted to receive the material from said conveyer, a long slow-moving conveyer adapted to receive the material from said cleaning and crushing mechanisms, a second series of cleaning and crushing mechanisms to receive the tow material from said slow-moving conveyer, a second slow-moving conveyer, a third series of cleaning and crushing mechanisms, conveyers provided beneath said cleaning and crushing mechanisms to receive the refuse material therefrom and take it out of the machine, an air-blast trunk provided in the bottom of said casing and adapted to direct a hot blast of air through the tow material as it passes through said mechanisms and over said slow-moving conveyers, and a carrier whereto the finished tow material is delivered at the discharge end of said casing, substantially as described.

12. In a machine of the class described, the combination, with an inclined perforated shaker, of crushing-rolls arranged in the rear of the same, an inclined plate provided beneath said shaker and near said crushing-rolls, an adjustable strip provided on said plate, and carding-cylinders provided in the rear of said crushing-rolls and adapted to receive the stream of tow material therefrom, substantially as described.

13. In a machine of the class described, the combination, with an inclined perforated shaker, of crushing-rolls to receive the tow material therefrom, carding-cylinders provided in the rear of said crushing-rolls to receive the stream of tow passing between the same, a second inclined perforated shaker whereon the material falls from said carding-cylinders, a second set of crushing-rolls, a beater to engage the material as it passes between said second set of rolls, a carrier to receive the material from said beater, and means for establishing a current of hot air through and under the material as it passes over said shakers and between said rolls and cylinders, substantially as described.

14. The combination, with a closed box or casing having a hopper-opening at one end and a discharge-opening at the other, of a straw-receiving mechanism provided at the receiving end of said casing, crushing-rolls and beaters adapted to receive the material from said receiving mechanism, an inclined conveyer having its lower end below the discharge side of the last beater of the series, and adapted to receive material therefrom and from said crushing-rolls, said conveyer being adapted to move at a slower speed than said beaters and crushing-rolls, whereby the material will pile up thereon, a picker provided at the upper end of said slow-moving conveyer, and means for maintaining a blast of hot air through said conveyer and the material thereon, substantially as described.

15. The combination, with a long closed box or casing having a hopper-opening at one end and a discharge-opening at the other, of a series of crushing-rolls and beaters adapted to receive the material deposited in said hopper, the inclined slowly-moving conveyer having its lower end beneath and near the last beater of the series and driven at a slower speed to permit the material to pile up to the desired height thereon, a picker provided at the upper end of said conveyer, a second series of crushing-rolls and beaters, a second inclined slowly-moving conveyer in the rear of said second series of rolls and beaters, the lower end of said second conveyer being lower than the last beater of the series and having a slower speed than the same, a second picker provided at the upper end of said second conveyer, and means for establishing a hot blast through the material as it passes through said first and second series of rolls and beaters and over said slowly-moving conveyers, substantially as described.

16. The combination, with a closed box or casing provided with receiving and discharge openings, of a straw crushing and cleaning mechanism provided therein and adapted to treat the straw or tow stock fed into the same to soften the fiber and separate the refuse material therefrom, and an air-blast apparatus adapted to direct currents of air through the material as it passes over or through said mechanism, substantially as described.

17. The combination, with a closed box or casing provided with receiving and discharge openings, of a crushing and cleaning mechanism therein adapted to treat the straw or tow stock fed into the same to soften the fiber and separate the refuse material therefrom, a conveyer adapted to receive the material from said crushing and cleaning mechanism, said conveyer moving at a slower speed than said mechanism, whereby the material will pile up thereon, and means for establishing blasts of air through the material as it is carried along by said conveyer, substantially as described.

In witness whereof I have hereunto set my hand this 13th day of April, 1900.

JOHN T. SMITH.

In presence of—
L. B. LERUD,
C. A. MAGIN.